United States Patent
Voruganti

(10) Patent No.: US 7,613,953 B2
(45) Date of Patent: Nov. 3, 2009

(54) METHOD OF CONVERTING A REGRESSION TEST SCRIPT OF AN AUTOMATED TESTING TOOL INTO A FUNCTION

(75) Inventor: Venkata Subbarao Voruganti, Belmont, CA (US)

(73) Assignee: Oracle International Corporation, Redwood Shroes, CA (US)

( * ) Notice: Subject to any disclaimer, the term of this patent is extended or adjusted under 35 U.S.C. 154(b) by 523 days.

(21) Appl. No.: 10/446,334

(22) Filed: May 27, 2003

(65) Prior Publication Data

US 2009/0070742 A1    Mar. 12, 2009

(51) Int. Cl.
G06F 11/00    (2006.01)

(52) U.S. Cl. ...................................................... 714/38

(58) Field of Classification Search .............. 714/32, 714/33, 37, 38, 45, 46; 717/116, 124; 702/123; 703/22

See application file for complete search history.

(56) References Cited

U.S. PATENT DOCUMENTS

| | | | | |
|---|---|---|---|---|
| 5,157,782 A * | 10/1992 | Tuttle et al. | ........... | 714/45 |
| 5,218,605 A * | 6/1993 | Low et al. | ........... | 714/45 |
| 5,335,342 A * | 8/1994 | Pope et al. | ........... | 714/38 |
| 5,475,843 A * | 12/1995 | Halviatti et al. | ........... | 717/124 |
| 5,594,892 A * | 1/1997 | Bonne et al. | ........... | 703/22 |
| 5,596,714 A * | 1/1997 | Connell | ........... | 714/38 |
| 5,600,789 A * | 2/1997 | Parker et al. | ........... | 714/38 |
| 5,634,002 A * | 5/1997 | Polk et al. | ........... | 714/38 |
| 5,642,472 A * | 6/1997 | Cohen | ........... | 706/12 |
| 5,673,387 A * | 9/1997 | Chen et al. | ........... | 714/38 |
| 5,694,540 A * | 12/1997 | Humelsine et al. | ........... | 714/38 |
| 5,758,062 A | 5/1998 | McMahon et al. | ........... | 395/183.14 |
| 5,778,169 A * | 7/1998 | Reinhardt | ........... | 714/38 |
| 5,781,720 A * | 7/1998 | Parker et al. | ........... | 714/38 |
| 5,881,219 A * | 3/1999 | Leung et al. | ........... | 714/31 |
| 6,061,643 A * | 5/2000 | Walker et al. | ........... | 714/38 |
| 6,269,457 B1 * | 7/2001 | Lane | ........... | 714/38 |
| 6,360,332 B1 * | 3/2002 | Weinberg et al. | ........... | 714/4 |
| 6,421,793 B1 * | 7/2002 | Lester et al. | ........... | 714/37 |
| 6,662,312 B1 * | 12/2003 | Keller et al. | ........... | 714/38 |
| 6,823,495 B1 * | 11/2004 | Vedula et al. | ........... | 715/805 |
| 6,898,784 B1 * | 5/2005 | Kossatchev et al. | ........... | 717/126 |
| 6,948,152 B2 * | 9/2005 | Dubovsky | ........... | 717/124 |
| 6,961,873 B2 * | 11/2005 | Dubovsky | ........... | 714/38 |
| 6,966,013 B2 * | 11/2005 | Blum et al. | ........... | 714/38 |
| 7,178,149 B2 * | 2/2007 | Hansen | ........... | 719/310 |
| 2002/0091968 A1 * | 7/2002 | Moreaux et al. | ........... | 714/38 |
| 2005/0137844 A1 * | 6/2005 | Voruganti | ........... | 704/2 |
| 2007/0006043 A1 * | 1/2007 | Pins | ........... | 714/38 |

* cited by examiner

Primary Examiner—Robert Beausoliel
Assistant Examiner—Elmira Mehrmanesh
(74) Attorney, Agent, or Firm—Townsend and Townsend and Crew LLP

(57) ABSTRACT

A method of converting a regression test script of an automated testing tool into a function. The regression test script is received, wherein the regression test script comprises at least one object. A physical description of object is inserted into the regression test script. The regression test script is compiled to generate the function.

26 Claims, 6 Drawing Sheets

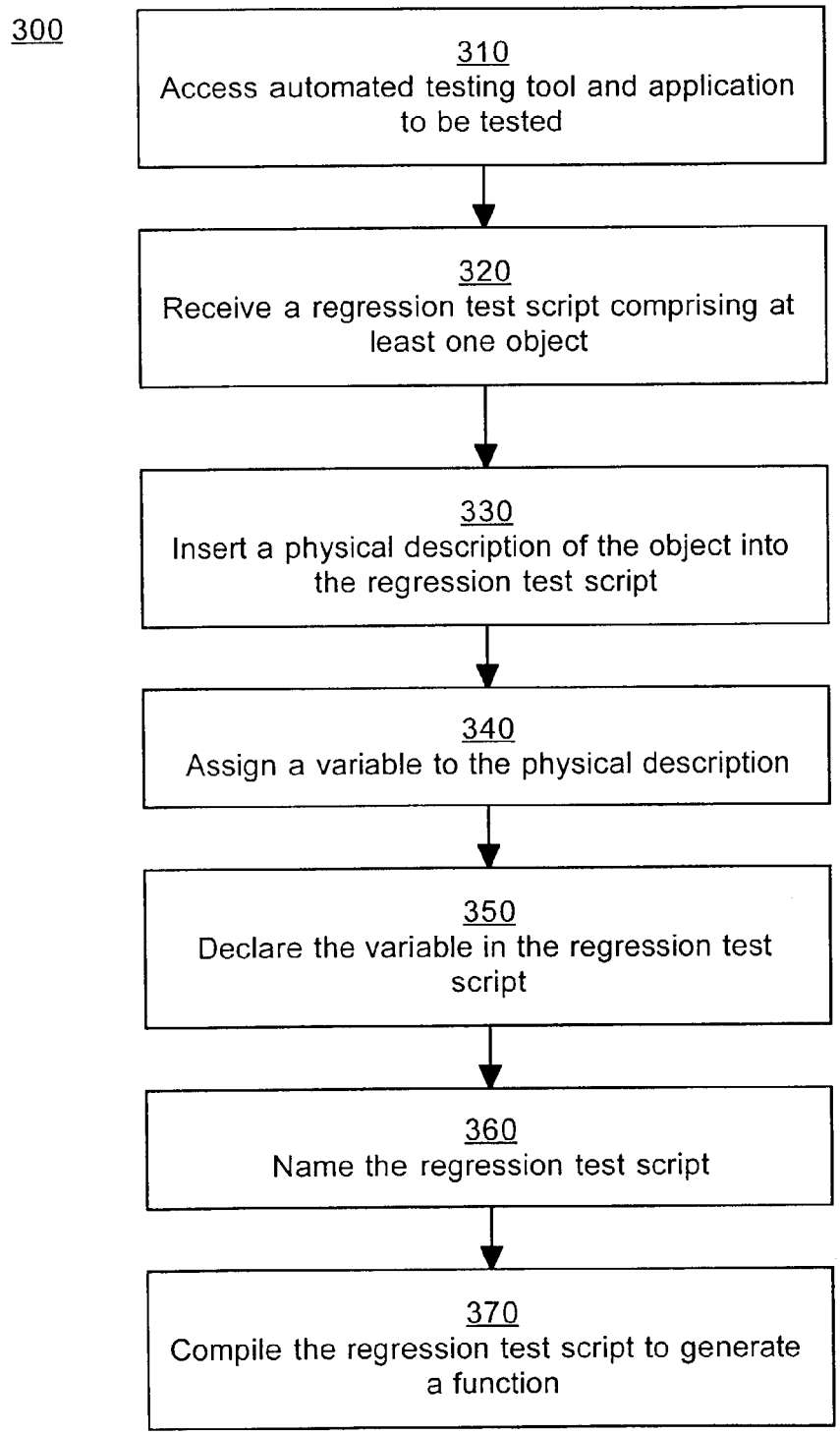

GUI_add("<Temporary>", "Responsibilities", "",
"{class: window, label: \"!Responsibilities.*\", mic_if_handles_windows: 1}")

410

Responsibilities=("{class: window, label: \"!Responsibilities.*\",
mic_if_handles_windows: 1}")

420 public function create_customer()
    {
       .... Body of the test script
       ..........................
    }

430

| Original Data-Driven Commands | Global Data-Driven Commands |
| --- | --- |
| ddt_open(table, DDT_MODE_READWRITE) | global_ddt_open(table, DDT_MODE_READWRITE) |
| ddt_set_row(table,1) | global_ddt_set_row(table,1) |
| ddt_save(table) | global_ddt_save(table) |
| ddt_close(table) | global_ddt_close(table) |

440 reload(getvar("curr_dir")&"//global_ddt_functions")

505
Access automated testing tool and application to be tested

↓

510
Receive a data-driven regression test script comprising at least one object

↓

515
Insert a physical description of the object into the data-driven regression test script

↓

520
Assign a variable to the physical description

↓

525
Declare the variable in the data-driven regression test script

↓

( A )

METHOD OF CONVERTING A REGRESSION TEST SCRIPT OF AN AUTOMATED TESTING TOOL INTO A FUNCTION

FIELD OF INVENTION

Embodiments of the present invention pertain to the field of automated testing tools. More particularly, the present invention relates to a method of converting a regression test script of an automated testing tool into a function.

BACKGROUND OF THE INVENTION

In order to ensure the quality of software applications, quality assurance (e.g., QA) engineers use a variety of tools and procedures. For example, if an application has been modified, QA engineers test the application in order to ensure that additional bugs have not been introduced. Automated testing tools that perform regression testing are typically used to test the quality of a software application. WinRunner, by Mercury Interactive, is an example of an automated testing tool.

Regression testing is a quality control measure to ensure that newly modified code still complies with its specified requirements and that unmodified code has not been affected by any modifications. Regression testing is often used to the selectively retest a software application that has been modified to ensure that any bugs have been fixed. Furthermore, regression testing can be used to ensure that no other previously-working functions have failed as a result of the reparations and that newly added features have not created problems with previous versions of the software.

Depending on the complexity of the application being tested, a regression test script can take a long time for a QA engineer to create. Similarly, for complex applications, a large number of QA engineers may be testing the application to ensure its quality. Often, different QA engineers may be testing similar aspects of the application. Unfortunately, regression tests used by one QA engineer are not easily shared, requiring each QA engineer to create and maintain their own regression test scripts.

Furthermore, regression test scripts often require external data to operate. For example, in the WinRunner automated testing tool, an external GUImap is used to store physical descriptions of objects of regression test scripts. Each regression test script requires a GUImap to function properly. Since GUImaps are specific to a particular regression test script, it is typically not possible to share GUImaps between QA engineers, requiring each QA engineer to create and maintain their own GUImaps.

Requiring QA engineers to create and maintain their own regression test scripts and GUImaps presents a number of disadvantages. For one, the work to create and test scripts and their associated GUImaps is often duplicated across several QA engineers, resulting in duplication of work and decreased productivity. Furthermore, even if a regression test script is shared among a number of QA engineers, if a change is made to the regression test script, it must be made by every QA engineer in every regression test script and its associated GUImap. Currently, due to the typical practice of QA engineers maintaining several GUImaps with different versions, maintenance of regression test scripts and GUImaps is very time consuming and further reduces productivity.

SUMMARY OF THE INVENTION

Accordingly, a need exists for a method of using automated testing tool without requiring an external GUImap. A need also exists that satisfies the above need and provides a function that is available from a central location. Furthermore, a need exists that satisfies the above needs and provides an easy way to alter the physical description of any object if any change is required. A need also exists that satisfies the above needs and provides a function that is data-driven.

In one embodiment, a method of converting a regression test script of an automated testing tool into a function is presented. The regression test script comprising at least one object is received. In one embodiment, the regression test script is recorded according to the automated testing tool. In one embodiment, regression test script is written in Test Script Language (TSL).

A physical description of the object is inserted into the regression test script. In one embodiment, a variable is assigned to the physical description. The variable is declared in the regression test script.

In one embodiment, the regression test script is data-driven. In one embodiment, a command to connect the regression test script to a data table is assigned. In one embodiment, the command is designated as a global command. In one embodiment, the command is reloaded for making the command available in a public library. In one embodiment, the regression test script is named. The regression test script is compiled to generate the function.

In another embodiment, a method of converting a data-driven regression test script of an automated testing tool into a data-driven function is presented. The data-driven regression test script comprising at least one object is received. In one embodiment, the data-driven regression test script is recorded according to the automated testing tool. In one embodiment, the data-driven regression test script is written in Test Script Language (TSL).

A physical description of the object is inserted into the data-driven regression test script. A variable is assigned to the physical description. The variable is declared in the data-driven regression test script.

A command is assigned to connect the data-driven regression test script to a data table. In one embodiment, the command is designated as a global command. In one embodiment, the command is reloaded for making the command available in a public library.

In one embodiment, the data-driven regression test script is named. The data-driven regression test script is compiled to generate the data-driven function.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 3 illustrates a flowchart showing steps in a process of converting a regression test script of an automated testing tool into a function in accordance with one embodiment of the present invention.

FIG. 4 illustrates exemplary Test Script Language (TSL) program code in accordance with embodiments of the invention.

FIGS. 5A and 5B illustrate a flowchart showing steps in a process of converting a data-driven regression test script of an automated testing tool into a data-driven function in accordance with one embodiment of the present invention.

DETAILED DESCRIPTION

Figure 1:
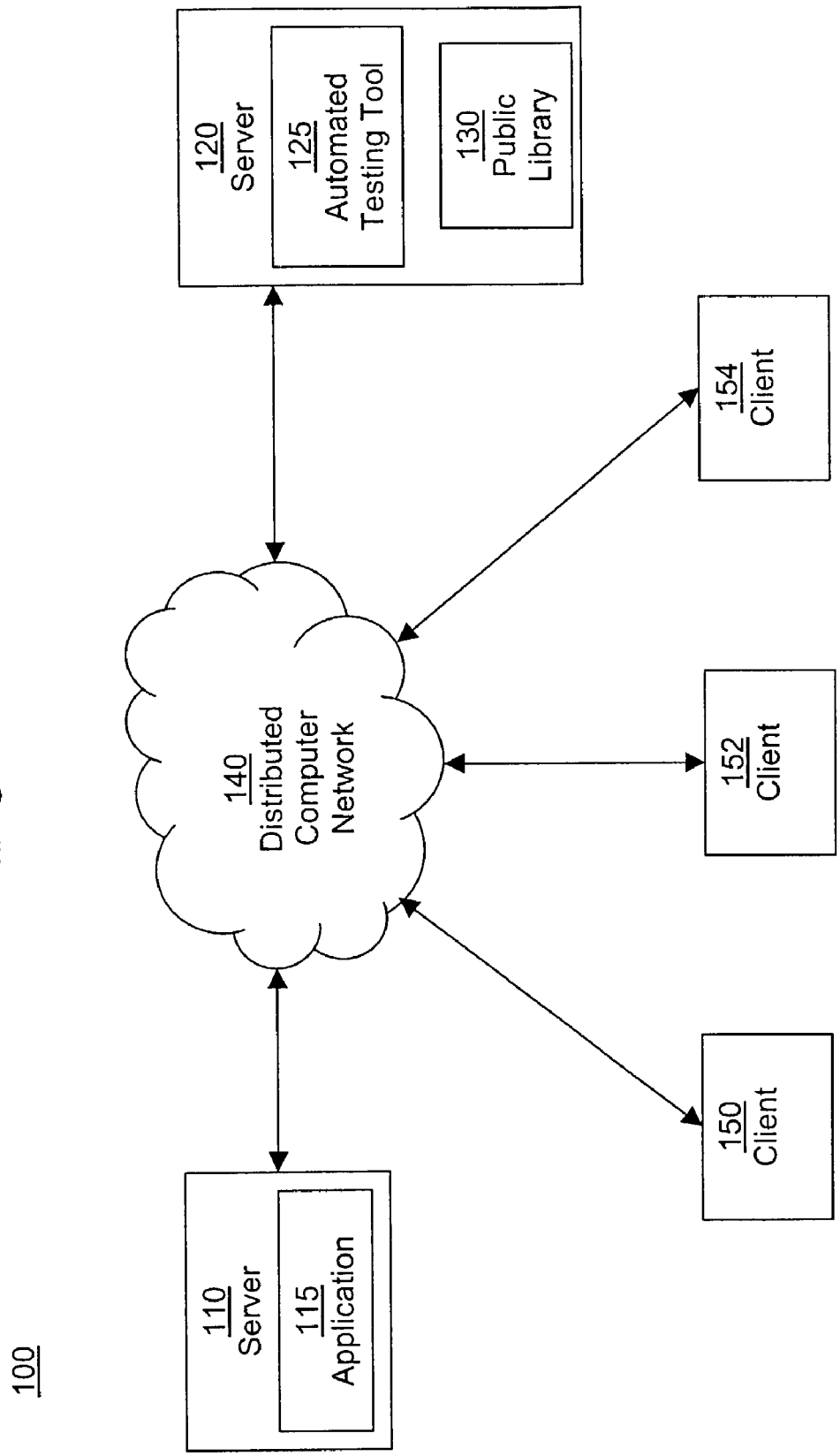
FIG. 1 illustrates a block diagram of an exemplary centralized environment upon which embodiments of the present invention may be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Embodiments of the present invention provide methods for converting regression test of an automated testing tool into a function. In one embodiment, the present invention provides a process for converting a regression test script of an automated testing tool into a function. In another embodiment, the present invention provides a process for converting a data-driven regression test script of an automated testing tool into a data-driven function.

Notation and Nomenclature

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "recording" or "inserting" or "compiling" or "assigning" or "designating" or "reloading" or "declaring" or "renaming" or the like, may refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Exemplary Hardware upon which Embodiments of the Present Invention may be Implemented FIG. 1 illustrates a block diagram of an exemplary centralized environment 100 upon which embodiments of the present invention may be implemented. As depicted in FIG. 1, centralized environment 100 includes two servers 110 and 120 communicatively coupled to clients 150, 152 and 154 via distributed computer network 140.

In one embodiment, application 115 is resident on server 110 and automated testing tool 125 is resident on server 120. Application 115 is a software application that is subject to quality assurance (QA) testing as performed by automated testing tool 125. Automated testing tool 125 is operable to run test scripts on application 115 for testing the quality of application 115. Public library 130 resident on server 120 comprises publicly available functions. It should be appreciated that public library 130 may reside within a different server connected to distributed computer network 140.

In one embodiment, automated testing tool 125 and application 115 are accessed from client 150 over distributed computer network 140. A test script defining at least one regression test is run on application 115 through automated testing tool 125. In one embodiment, automated testing tool 125 comprises a driver for running a test script. The driver interacts with and executes application 115. In one embodiment, the test script is received at automated testing tool 125 from client 130.

It should be noted that the embodiment of the present invention depicted in FIG. 1 (e.g., system 100) is implemented as a software based process cooperatively executing on the respective computer system platforms of servers 110 and 120 and clients 150, 152 and 154. The basic components of the computer system platforms are shown in the example computer system 200 of FIG. 2 below.

Referring still to FIG. 1, distributed computer network 140 includes well know network technologies. For example, distributed computer network 140 can be implemented using LAN technologies (e.g., Ethernet, Tokenring, etc.), the Internet, or other wired or wireless network technologies. The communications links between server 110, server 120, clients 150, 152 and 154, and distributed computer network 140 can be implemented using, for example, a telephone circuit, communications cable, optical cable, wireless link, or the like.

Figure 2:
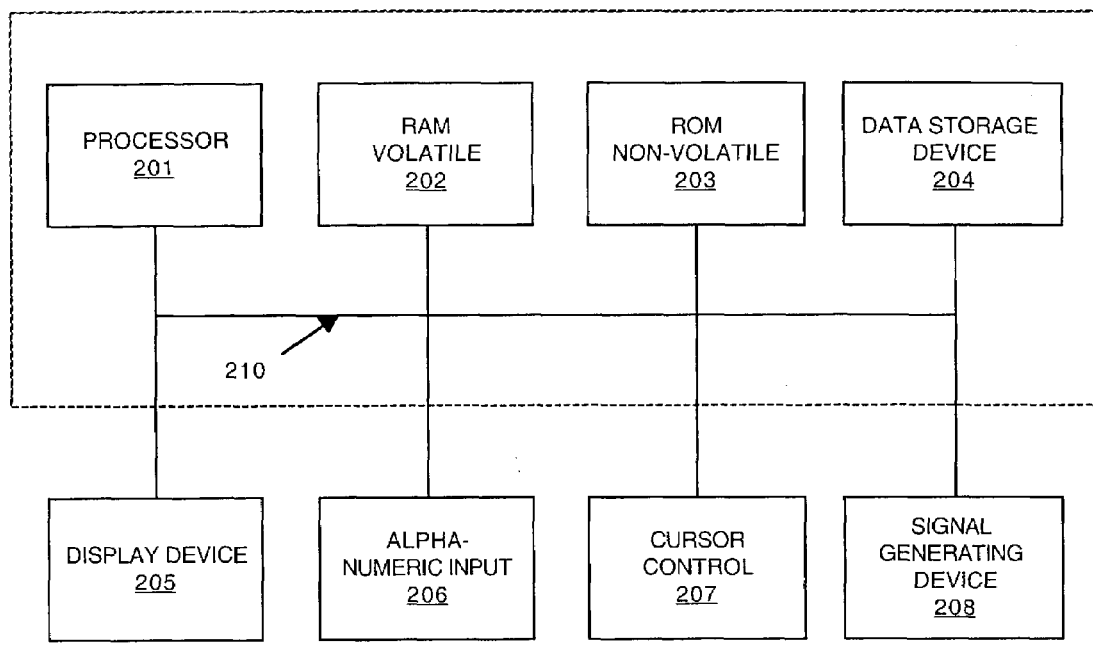
FIG. 2 illustrates a block diagram of an exemplary computer system upon which embodiments of the present invention may be implemented.

Other embodiments of the present invention may be implemented on a single computer system, such as computer system 200 of FIG. 2. In the present embodiment, the automated testing tool and the application are resident on the same computer system. It should be appreciated that embodiments of the present invention may be implemented on any number of servers and clients, and that the automated testing tool and the application to be testing can reside on the same computer system or on separate computer systems.

FIG. 2 illustrates a block diagram of an exemplary computer system 200 upon which embodiments of the present invention may be implemented. Portions of the present invention are comprised of computer-readable and computer executable instructions which reside, for example, in computer-usable media of computer system 200. Computer system 200 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 200) and are executed by the processor(s) of system 200. When executed, the instructions cause the computer system 200 to implement the functionality of the present invention as described above.

In general, computer system 200 shows the basic components of a computer system used to implement "server" machines and "client" machines. Computer system 200 comprises an address/data bus 210 for communicating information, one or more central processors 201 coupled with the bus 210 for processing information and instructions, a computer readable volatile memory unit 202 (e.g., random access memory, static RAM, dynamic, RAM, etc.) coupled with the bus 210 for storing information and instructions for the central processor(s) 201, a computer readable non-volatile memory unit 203 (e.g., read only memory, programmable ROM, flash memory, EPROM, EEPROM, etc.) coupled with the bus 210 for storing static information and instructions for the processor(s) 201. System 200 also includes a computer readable data storage device 204 such as a magnetic or optical disk and disk drive coupled with the bus 210 for storing information and instructions. Optionally, system 200 can include a display device 205 coupled to the bus 210 for displaying information to the computer user, an alphanumeric input device 206 including alphanumeric and function keys coupled to the bus 210 for communicating information and command selections to the central processor(s) 201, a cursor control device 207 coupled to the bus for communicating user input information and command selections to the central processor(s) 201, and a signal generating device 208 coupled to the bus 210 for communicating command selections to the processor(s) 201.

A Process of Converting a Regression Test Script of an Automated Testing Tool into a Function FIG. 3 illustrates a flowchart showing steps in a process 300 of converting a regression test script of an automated testing tool into a function in accordance with one embodiment of the present invention. In one embodiment, process 300 is carried out by processors and electrical components (e.g., computer system 200 of FIG. 2) under the control of computer readable and computer executable instructions. Although specific steps are disclosed in process 300, such steps are exemplary. That is, the embodiments of the present invention are well suited to performing various other steps or variations of the steps recited in FIG. 3.

At step 310 of FIG. 3, an automated testing tool is accessed. The automated testing tool is operable to implement regression test scripts (e.g., regression tests) to test the quality of a software application. In one embodiment, the automated testing tool is operable to record regression test scripts. An automated testing tool comprises a driver for running functions and test scripts associated with the QA testing.

At step 320, a regression test script is received, wherein the regression test script comprises at least one object. An object describes an action initiated by the regression test script, such as interacting with a button of the application being tested or inputting data into a query box of the application being tested. In one embodiment, the regression test script is received from a client device (e.g., client 150 of FIG. 1). In another embodiment, the regression test is recorded according to the automated testing tool. For example, a business flow is recorded by interacting with the application being tested using the automated testing tool. Specific actions are recorded and stored as objects of a regression test script. In one embodiment, the regression test script is written in Test Script Language (TSL).

At step 330, a physical description of objects is inserted into the regression test script. The physical description comprises specific characteristics of an object, such as class of the object, label/name of the object, and location/index, as well as other characteristics. The physical description of an object is useful for identifying a specific object to interact with while testing the application. For example, the physical description of a button identifies the specific button for the automated testing tool to interact with (e.g., click on) the specific button. Similarly, the physical description of an edit field recognizes the specific edit field to enter data into the specific edit field or to interact with a query field to enter a query value. In one embodiment, the physical description of an object is stored externally to the regression test script. For example, the physical description of the object may be stored in a GUImap.

In one embodiment, the physical description of all the objects is copied from the GUImap into the regression test script. It should be appreciated that the source of the physical description may be an unsaved temporary GUImap, a saved permanent GUImap, or any other location for storing a physical description of an object. Furthermore, such as the "GUI spy" tool of WinRunner, other tools may be used to acquire the physical description if a temporary or permanent GUImap is unavailable.

For example, the physical description of an object titled "Responsibilities" can be inserted into the regression test script using TSL either by way of "GUI_add" statements, as shown at code 400 of FIG. 4, or by declaring a variable, as shown at code 410 of FIG. 4. By inserting the physical description of the object directly into the regression test script, the regression test script will not be dependent upon any external GUImap. It also ensures that the physical descriptions of all the required objects are taken into account.

With reference to FIG. 3, at step 340, a variable is assigned to the physical description. The variable allows the regression test script to recognize the object in any instance. Using TSL, as shown in code 400 and 410 of FIG. 4, the terms "!" and ".*" bookend the label property for the "Responsibilities" object.

At step 350, the variable is declared in the regression test script. In one embodiment, all the variables used in the regression test script are noted and declared at the top of the regression test script.

At step 360, the regression test script is named. In one embodiment an intuitive name is given to the entire regression test script to make it a function. Code 420 of FIG. 4 illustrates and example TSL code for naming the regression test script. When using TSL, it is necessary to ensure that the entire body of the script resides within the name of the function.

At step 370, the regression test script is compiled to generate the function. In one embodiment, the regression test script is compiled by using a compile function of the automated testing tool. It may be necessary to identify details of any parameters of the regression test script to be compiled. Once the regression test script is compiled, it is a function.

Embodiments of the present invention provide for easily converting a regression test script into a function. This function may be invoked from any other function, from a regression test script, or from a driver. The function can be made available at a central location in the form of a library and can be sharable by the entire user community. Furthermore, if any change is required to the physical description of any object, it needs to be done only once in the central library.

Figure 5B:
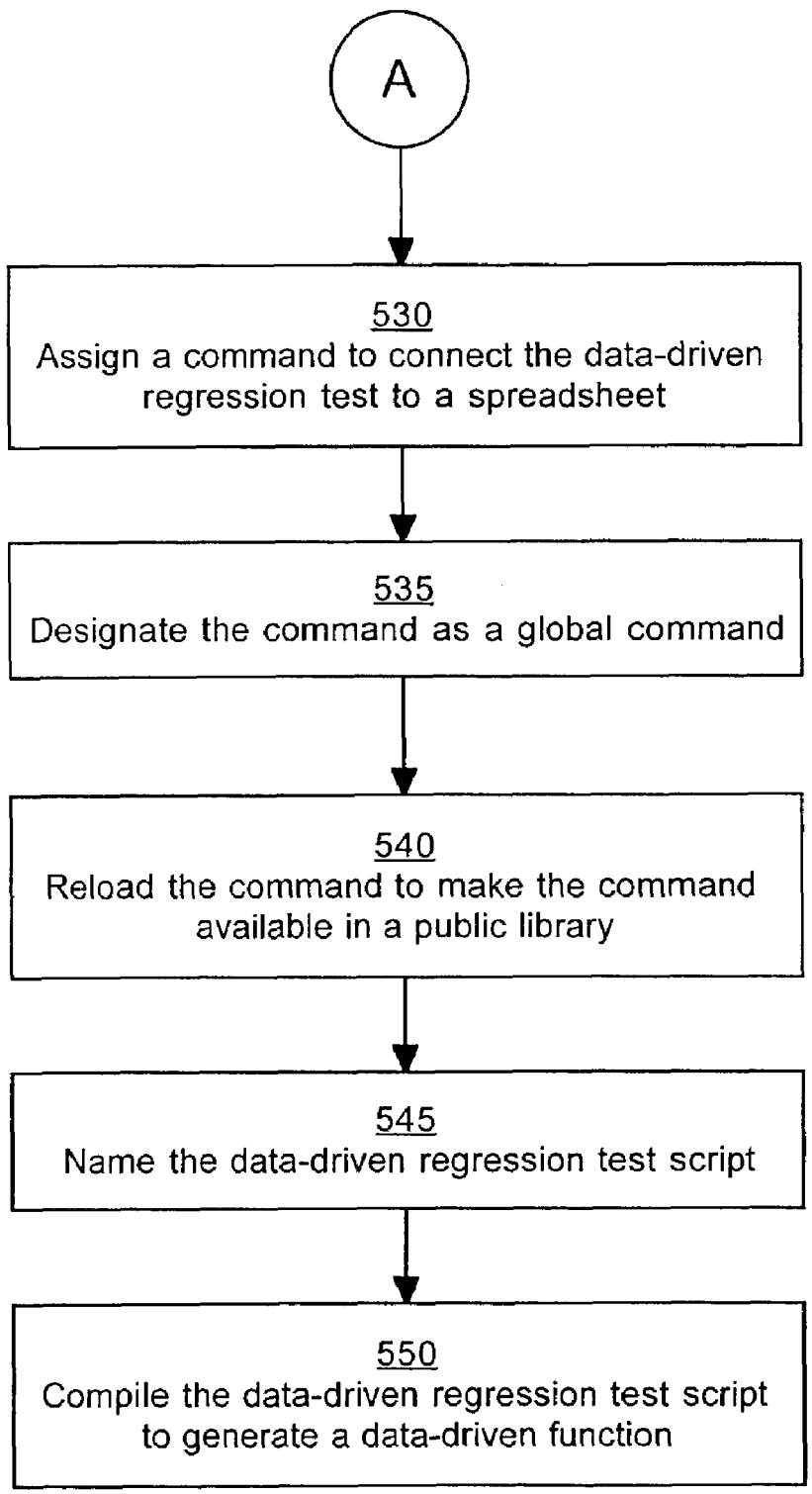

FIGS. 5A and 5B illustrate a flowchart showing steps in a process 500 of converting a data-driven regression test script of an automated testing tool into a data-driven function in accordance with one embodiment of the present invention. In one embodiment, process 500 is carried out by processors and electrical components (e.g., computer system 200 of FIG. 2) under the control of computer readable and computer executable instructions. Although specific steps are disclosed in process 500, such steps are exemplary. That is, the embodiments of the present invention are well suited to performing various other steps or variations of the steps recited in FIG. 5.

At step 505 of FIG. 5, an automated testing tool is accessed. The automated testing tool is operable to implement data-driven regression test scripts (e.g., regression tests) to test the quality of a software application. In one embodiment, the automated testing tool is operable to record data-driven regression test scripts. An automated testing tool comprises a driver for running functions and test scripts associated with the QA testing.

At step 510, a data-driven regression test script is received, wherein the data-driven regression test script comprises at least one object. An object describes an action initiated by the data-driven regression test script, such as interacting with a button of the application being tested or inputting data into a query box of the application being tested. In one embodiment, the data-driven regression test script is received from a client device (e.g., client 150 of FIG. 1). In another embodiment, the regression test is recorded according to the automated testing tool. For example, a business flow is recorded by interacting with the application being tested using the automated testing tool. Specific actions are recorded and stored as objects of a data-driven regression test script. In one embodiment, the data-driven regression test script is written in Test Script Language (TSL).

At step 515, a physical description of objects is inserted into the data-driven regression test script. The physical description describes the specific actions of an object, such as location of a button to interact with or specific data to enter into a query box. In one embodiment, the physical description of an object is stored externally to the data-driven regression test script. For example, the physical description of the object may be stored in a GUImap.

In one embodiment, the physical description of all the objects is copied from the GUImap into the data-driven regression test script. It should be appreciated that the source of the physical description may be an unsaved temporary GUImap, a saved permanent GUImap, or any other location for storing a physical description of an object. Furthermore, such as the "GUI spy" tool of WinRunner, other tools may be used to acquire the physical description if a temporary or permanent GUImap is unavailable.

For example, the physical description of an object titled "Responsibilities" can be inserted into the data-driven regression test script using TSL either by way of "GUI_add" statements, as shown at code 400 of FIG. 4, or by declaring a variable, as shown at code 410 of FIG. 4. By inserting the physical description of the object directly into the data-driven regression test script, the data-driven regression test script will not be dependent upon any external GUImap. It also ensures that the physical descriptions of all the required objects are taken into account.

With reference to FIG. 5, at step 520, a variable is assigned to the physical description. The variable allows the data-driven regression test script to recognize the object in any instance. Using TSL, as shown in code 400 and 410 of FIG. 4, the terms "!" and ".*" bookend the label property for the "Responsibilities" object.

At step 525, the variable is declared in the data-driven regression test script. In one embodiment, all the variables used in the data-driven regression test script are noted and declared at the top of the data-driven regression test script .

At step 530, a command is assigned to connect the data-driven regression test script to a data table. The data table comprises data used by the data-driven regression test script in testing the application. In one embodiment, the data table is a spreadsheet. For example, where the application is an enterprise application, the data table may comprise exemplary customer information for a number of customers, such as customer name, customer number, items purchased, outstanding balance, and other data used to test the quality of the application. In one embodiment, the command connecting the data-driven regression test script to the data table is generated by using a tool of the automated testing tool. For example, a data-driven wizard may be used to generate the command.

At step 535, the command is designated as a global command. In TSL, the command may be designated as global by prefixing the command with the string 'global_'. For example, prefixing the command 'ddt_function' with 'global_' invokes the custom 'global_ddt_functions' instead of the usual 'ddt_function'. Code 430 of FIG. 4 illustrates several examples of converting the command into a global command for accessing the data of the data table. It should be appreciated that in some automated testing tools, the command may not work within a function. Thus, it is necessary to convert the command into a global command to allow it to work within a function.

At step 540, the command is reloaded to make it available in a public library. Code 440 of FIG. 4 illustrates an example reload statement in accordance with TSL. It should be appreciated that step 540 is necessary in automated testing tools where the command is not automatically placed in the public library. However, it should be appreciated that in some automated testing tools, it is not necessary to reload the command for it to be placed in the public library. Thus, step 540 may not be necessary.

At step 545, the data-driven regression test script is named. In one embodiment an intuitive name is given to the entire data-driven regression test script to make it a data-driven function. Code 420 of FIG. 4 illustrates and example TSL code for naming the data-driven regression test script. When using TSL, it is necessary to ensure that the entire body of the script resides within the name of the data-driven function.

At step 550, the data-driven regression test script is compiled to generate the data-driven function. In one embodiment, the data-driven regression test script is compiled by using a compile data-driven function of the automated testing tool. It may be necessary to identify details of any parameters of the data-driven regression test script to be compiled. Once the data-driven regression test script is compiled, it is a data-driven function.

Embodiments of the present invention provide for easily converting a regression test script into a function. This function may be invoked from any other function, from a regression test script, or from a driver. The function can be made available at a central location in the form of a library and can be sharable by the entire user community. Furthermore, if any change is required to the physical description of any object, it needs to be done only once in the central library. Since the functions are data-driven, the same function can be used by different users for creating different transactions, as there can be more than one data table attached to a function and the name of the table can be given as a parameter to the function. The functions can be maintained in a single library for all products as a source of truth. Optionally, each product family can take the sharable functions from the single source of truth and use them for their own testing needs by adding different data tables or functionality to suit their own needs.

Various embodiments of the present invention, a method of converting a regression test script of an automated testing tool into a function, are thus described. While the present invention has been described in particular embodiments, it should be appreciated that the present invention should not be construed as limited by such embodiments, but rather construed according to the below claims.

What is claimed is:

1. A method of converting a regression test script of an automated testing tool into a function, said method comprising:
   receiving said regression test script comprising at least one object, wherein said object describes at least one action initiated by said regression test script to test a software application;
   inserting a physical description related to said object into said regression test script, said physical description copied from an external GUI map;
   assigning a variable name to said physical description;
   compiling said regression test script comprising said object and said physical description referenced by the variable name to generate said function such that a regression test is subsequently performed according to said regression test script by invoking said function and does not require the external GUI map;
   storing said function in a centralized library accessible by a plurality of users allowing said function to be shared between different regression tests and reused for said subsequent regression test, wherein the function comprises the regression test script and is executed to implement the regression test script; and
   testing the software application by invoking the stored function, wherein the stored function performs the regressive test without the external GUI map.

2. The method as recited in claim 1 wherein said regression test script is data-driven.

3. The method as recited at claim 2 furthering comprising assigning a command to connect said regression test script to a data table.

4. The method as recited in claim 3 further comprising designating said command as a global command.

5. The method as recited in claim 4 further comprising reloading said command for making said command available in a public library.

6. The method as recited in claim 1 further comprising:
   declaring said variable name in said regression test script.

7. The method as recited in claim 1 further comprising naming said regression test script.

8. The method as recited in claim 1 wherein said regression test script is written in Test Script Language (TSL).

9. The method as recited in claim 1 wherein regression test script is recorded according to said automated testing tool.

10. A computer-readable medium having computer-readable program code embodied therein for causing a computer system to perform a method of convening a regression test script of an automated testing tool into a function, said method comprising:
    receiving said regression test script comprising at least one object, wherein said object describes at least one action initiated by said regression test script to test a software application;
    inserting a physical description related to said object into said regression test script, said physical description copied from an external GUI map;
    assigning a variable name to said physical description;
    compiling said regression test script including said object and said physical description referenced by the variable name to generate said fUnction such that a regression test is subsequently performed according to said regression test script by invoking said function and does not require the external GUI map;
    storing said function in a centralized library accessible by a plurality of users allowing said function to be shared between different regression tests and reused for said subsequent regression test, wherein the function comprises the regression test script and is executed to implement the regression test script; and
    testing the software application by invoking the stored function, wherein the stored function performs the regressive test without the external GUI map.

11. The computer-readable medium as recited in claim 10 wherein said regression test script is data-driven.

12. The computer-readable medium as recited at claim 11 wherein said method further comprises assigning a command to connect said regression test script to adata table.

13. The computer-readable medium as recited in claim 12 wherein said method further comprises designating said command as a global command.

14. The computer-readable medium as recited in claim 13 wherein said method further comprises reloading said command for making said command available in a public library.

15. The computer-readable medium as recited inclaim 10 wherein said method further comprises:
    declaring said variable name in said regression test script.

16. The computer-readable medium as recited in claim 10 wherein said method further comprises naming said regression test script.

17. The computer-readable medium as recited in claim 10 wherein said regression test script is written in Test Script Language (TSL).

18. The computer-readable medium as recited in claim 10 wherein regression test script is recorded according to said automated testing tool.

19. A method of converting a data-driven regression test script of an automated testing tool into a data-driven function, said method comprising:
    receiving said data-driven regression test script comprising at least one object,wherein said object describes at least one action initiated by said regression test script to test a software application;
    inserting a physical description related to said object into said data-driven regression test script, said physical description copied from an external GUI map;
    assigning a variable name to said physical description;
    declaring said variable name in said data-driven regression test script;
    assigning a command to connect said data-driven regression test script to a datatable comprising data used by said data-driven regression test script in testing said software application;
    compiling said data-driven regression test script comprising said object and said physical description to generate said data-driven function;
    storing said data-driven function in a centralized library accessible by a pluralityof users allowing said data-driven function to be shared between different regression tests andreused for said subsequent regression test; and testing the software application by executing the stored data-driven function, wherein the stored data-driven function performs the regressive test without the external GUI map.

20. The method as recited in claim 19 further comprising designating said command as a global command.

21. The method as recited in claim 20 further comprising reloading said command for making said command available in a public library.

22. The method as recited in claim 19 further comprising naming said data-driven regression test script.

23. The method as recited in claim 19 wherein said data-driven regression test script is written in Test Script Language (TSL).

24. The method as recited in claim 19 wherein said data-driven regression test script is recorded according to said automated testing tool.

25. A system for converting a regression test script of an automated testing tool into a function, said system comprising:
    means for receiving said regression test script comprising at least one object, wherein said object describes at least one action initiated by said regression test script to test a software application;
    means for inserting a physical description related to said object into said regression test script, said physical description copied from an external GUI map;
    means for assigning a variable name to said physical description;
    means for compiling said regression test script comprising said object and said physical description to generate said function such that a regression test is subsequently performed according to said regression test script by invoking said function and does not require the external GUI map;
    means for storing said function in a centralized library accessible by a plurality of users allowing said function to be shared between different regression tests and reused for said subsequent regression test, wherein the function comprises the regression test script and is executed to implement the regression test script; and
    means for testing the software application by invoking the stored function, wherein the stored function performs the regressive test without the external GUI map.

26. The system as recited in claim 25 wherein said regression test script is data-driven.

\* \* \* \* \*

UNITED STATES PATENT AND TRADEMARK OFFICE
CERTIFICATE OF CORRECTION

PATENT NO. : 7,613,953 B2  Page 1 of 2
APPLICATION NO. : 10/446334
DATED : November 3, 2009
INVENTOR(S) : Voruganti It is certified that error appears in the above-identified patent and that said Letters Patent is hereby corrected as shown below:

On the Title page, item (73), in column 1, in "Assignee", line 2, delete "Redwood Shroes," and insert -- Redwood Shores, --, therefor.

In column 1, line 66, after "using" insert -- an --.

In column 2, line 12, after "embodiment," insert -- the --.

In column 3, line 25, after "converting" insert -- a --.

In column 3, line 25, after "test" insert -- script --.

In column 4, line 32, delete "130." and insert -- 150. --, therefor.

In column 4, line 41, delete "know" and insert -- known --, therefor.

In column 6, line 13, after "(e.g., click on)" delete "the specific button".

In column 6, line 15, delete "into the specific edit field" and insert -- into, --, therefor.

In column 6, line 25, after "Furthermore," insert -- other tools, --.

In column 6, line 26, after "WinRunner," delete "other tools".

In column 6, line 51, delete "and example TSL" and insert -- an example of TSL --, therefor.

In column 8, line 4, delete "script ." and insert -- script. --, therefor.

In column 9, line 42, in claim 3, delete "furthering" and insert -- further --, therefor.

In column 9, line 61, in claim 10, delete "convening" and insert -- converting --, therefor.

Signed and Sealed this

Third Day of August, 2010

David J. Kappos
*Director of the United States Patent and Trademark Office*

CERTIFICATE OF CORRECTION (continued)
U.S. Pat. No. 7,613,953 B2

In column 10, line 7, in claim 10, delete "fUnction" and insert -- function --, therefor.

In column 10, line 24, in claim 12, delete "adata" and insert -- a data --, therefor.

In column 10, line 31, in claim 15, delete "inclaim" and insert -- in claim --, therefor.

In column 10, line 47, in claim 19, delete "object,wherein" and insert -- object, wherein --, therefor.

In column 10, line 57, in claim 19, delete "datatable" and insert -- data table --, therefor.

In column 10, line 64, in claim 19, delete "pluralityof" and insert -- plurality of --, therefor.

In column 10, line 66, in claim 19, delete "andreused" and insert -- and reused --, therefor.

UNITED STATES PATENT AND TRADEMARK OFFICE
CERTIFICATE OF CORRECTION

PATENT NO. : 7,613,953 B2
APPLICATION NO. : 10/446334
DATED : November 3, 2009
INVENTOR(S) : Venkata Subbarao Voruganti It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 664 days.

Signed and Sealed this

Nineteenth Day of October, 2010

David J. Kappos
*Director of the United States Patent and Trademark Office*